(12) United States Patent
Ferrara et al.

(10) Patent No.: US 10,289,540 B2
(45) Date of Patent: May 14, 2019

(54) PERFORMING ENTROPY-BASED DATAFLOW ANALYSIS

(71) Applicant: International Business Machines Corporation, Armonk, NY (US)

(72) Inventors: Pietro Ferrara, White Plains, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/287,071

(22) Filed: Oct. 6, 2016

(65) Prior Publication Data

US 2018/0101471 A1  Apr. 12, 2018

(51) Int. Cl.
*G06F 11/36* (2006.01)

(52) U.S. Cl.
CPC ...... *G06F 11/3692* (2013.01); *G06F 11/3604* (2013.01); *G06F 11/3612* (2013.01); *G06F 11/3688* (2013.01)

(58) Field of Classification Search
CPC ............. G06F 11/3692; G06F 11/3612; G06F 11/3688
USPC ........................................................ 717/128
See application file for complete search history.

(56) References Cited

U.S. PATENT DOCUMENTS

| | | | |
|---|---|---|---|
| 5,764,885 A * | 6/1998 | Sites ................... | G06F 11/3636 712/201 |
| 6,154,857 A * | 11/2000 | Mann ................... | G06F 11/3419 714/30 |
| 6,233,678 B1 * | 5/2001 | Bala .................... | G06F 11/3612 712/239 |
| 6,760,903 B1 * | 7/2004 | Morshed ............. | G06F 11/3466 717/130 |
| 7,712,093 B1 * | 5/2010 | Foley ................... | G06F 8/433 717/155 |
| 7,987,453 B2 * | 7/2011 | DeWitt, Jr. ......... | G06F 11/3409 712/227 |
| 8,423,965 B2 * | 4/2013 | Goel ................... | G06F 9/30018 717/126 |

(Continued)

OTHER PUBLICATIONS

Tripp et al., "Hawkeye: Effective Discovery of Dataflow Impediments to Parallelization", OOPSLA'11, Oct. 22, 27, 2011, Portland, Oregon, USA, pp. 207-223.

(Continued)

*Primary Examiner* — Lewis A Bullock, Jr.
*Assistant Examiner* — Theodore E Hebert
(74) *Attorney, Agent, or Firm* — Scully, Scott, Murphy & Presser, P.C.; Daniel Morris, Esq.

(57) ABSTRACT

Providing dataflow analysis by selecting a plurality of sampling points from a program under examination. A set of respective values is recorded from a corresponding set of memory registers at each of the plurality of sampling points. The set of respective values comprises at least a first set of values stored in a first set of memory registers for a first sampling point of the plurality of sampling points, and a second set of values stored in a second set of memory registers for a second sampling point of the plurality of sampling points. A correlation is performed between the first set of values and the second set of values to retrieve dataflow information from the program under examination.

18 Claims, 4 Drawing Sheets

(56) References Cited

U.S. PATENT DOCUMENTS

| | | | | |
|---|---|---|---|---|
| 2002/0002442 | A1* | 1/2002 | Rivin | G06F 11/3466 |
| | | | | 702/186 |
| 2004/0003375 | A1* | 1/2004 | George | G06F 11/3466 |
| | | | | 717/124 |
| 2004/0194077 | A1* | 9/2004 | Bharadwaj | G06F 11/3612 |
| | | | | 717/158 |
| 2005/0155022 | A1* | 7/2005 | DeWitt, Jr. | G06F 11/3612 |
| | | | | 717/131 |
| 2007/0250820 | A1* | 10/2007 | Edwards | G06F 11/3636 |
| | | | | 717/131 |
| 2010/0325359 | A1* | 12/2010 | Goel | G06F 9/30018 |
| | | | | 711/125 |
| 2013/0054942 | A1* | 2/2013 | Serrano | G06F 11/3612 |
| | | | | 712/234 |
| 2017/0017472 | A1* | 1/2017 | He | G06F 8/41 |
| 2018/0101471 | A1* | 4/2018 | Ferrara | G06F 11/3692 |

OTHER PUBLICATIONS

Enck et al., "TaintDroid: An Information-Flow Tracking System for Realtime Privacy Monitoring on Smartphones", OSDI'10, Proceedings of the 9th USENIX conference on Operating systems design and implementation, Vancouver, BC, Canada, Oct. 4-6, 2010, pp. 393-407.

Trip et al., "TAJ: Effective Taint Analysis of Web Applications", PLDI'09, Jun. 15-20, 2009, Dublin, Ireland, pp. 87-97.

"DroidBench—Benchmarks | Secure Software Engineering;", Secure Software Engineering at the Eurpean Center for Security and Privacy by Design—EC SPRIDE, Oct. 21, 2013-Aug. 1, 2016, http://web.archive.org/web/20160108133231/http://sseblog.ec-spride.de/tools/droidbench/, printed from Internet on Oct. 11, 2018; 2 pages.

* cited by examiner

PERFORMING ENTROPY-BASED DATAFLOW ANALYSIS

FIELD

The present application relates generally to computer programming and, more particularly, to techniques for providing entropy-based dataflow analysis.

BACKGROUND

Dataflow analysis is a technique for gathering information about possible sets of values calculated at various points during the execution of a computer program. One current approach to dataflow analysis tracks information flow at the level of small intermediate execution steps, statements, program states, or any of various combinations thereof. These execution steps, statements, and program states may be regarded as blocks. Usually it is sufficient to analyze information flow at the boundaries of these blocks. Thus, each statement in a programming language may be associated with a dataflow equation that describes how data flows due to execution of the statement. As an example, given x=y+z, the equation would relate v as well as x to z.

The set of dataflow equations may be formulated by considering that an entry state of a block is a function of one or more respective exit states each associated with a corresponding predecessor block. However, in some situations, a given block may not be associated with any predecessor blocks, whereupon the entry state of such a block would generally be well defined at the start of the dataflow analysis procedure. In a forward flow analysis, the set of dataflow equations may be formulated by considering that the exit state of the block is a function of an entry state of the block.

For purposes of illustration, a control flowgraph (CFG) may be used to determine those parts of a program to which a particular value assigned to a variable might propagate. Dataflow equations are formulated for each of a plurality of nodes in the CFG. These equations are solved by repeatedly calculating a local node output from a local node input at each of the plurality of nodes until the entire CFG stabilizes and reaches a fixpoint. A fixpoint of a function is an element of the function's domain that is mapped to itself by the function. Thus, c is a fixed point of the function f(x) if and only if f(c)=c.

Dataflow analysis techniques may be utilized in conjunction with infomation flow security, typestate monitoring, loop/code parallelization, just-in-time compilation optimization, or any of various combinations thereof. In the context of information flow security, a respective security level is assigned to each of a plurality of corresponding variables. A basic model of flow security may comprise two distinct levels: low for public observable information, and high for secret information. To ensure confidentiality, information flowing from high-level to low-level variables should not be allowed. On the other hand, to ensure integrity, flows from low-level to high-level variables should be restricted. More generally, security levels can be viewed as a lattice where dataflow analysis should indicate that information is flowing only in an upward direction through the lattice.

Typestate monitoring may be implemented in tandem with dataflow analysis. Typestate monitoring reflects how legal operations on one or more imperative objects can change at program runtime as the internal state of these objects changes. A typestate checker can statically ensure, for instance, that an object method is only called when the object is in a state for which the operation is defined.

Dataflow analysis may be used to provide loop/code parallelization. Loop/code parallelization refers to a conversion of sequential code into multi-threaded code, vectorized code, or both, in order to enable multiple processors to be used simultaneously in a shared-memory multiprocessor (SMP) machine. Loops represent a programming control structure which is strongly emphasized in the parallelization process. In general, a majority of the execution time of a program takes place when the program is executing instructions that are within a loop.

Just-in-time (JIT) compilation may be performed using dataflow analysis techniques. JIT compilation, also known as dynamic translation, is compilation that is performed during execution of a program—at run time—rather than prior to execution. The compilation process may include a translation of the program into another format such as machine code, which is then executed directly. JIT compilation is a combination of two traditional approaches to translation to machine code—ahead-of-time compilation (AOT), and interpretation—and combines some advantages and drawbacks of both. JIT compilation combines the speed of compiled code with the flexibility of interpretation, with the overhead of an interpreter and the additional overhead of compiling (not just interpreting). In theory, JIT compilation may be able to provide faster execution times than static compilation, but existing dataflow analysis techniques have not enabled JIT compilation to reach its full potential.

Conventional dataflow analysis approaches have several limitations. In terms of overhead, the need to track dataflow through all intermediate program states and statements leads to severe performance bottlenecks, sometimes on the order of several hundred times. These bottlenecks create usability problems. Likewise, in certain cases, a program under test ceases to behave correctly. Such behavioral issues may arise in situations where the program under test uses timers or timed events. Moreover, many applications are written in multiple languages. For example, mobile applications for the Android™ operating system are often written in a combination of Java™, JavaScript™, and native code. Tracking dataflow across language boundaries is very difficult. No existing solution is equipped to handle the commonly occurring situation of transitioning between managed and unmanaged code.

Yet another issue that stems from local tracking of dataflow is a loss of precision. In some cases, a dataflow analysis reaches a conservative but inaccurate conclusion due to an overly myopic form of reasoning employed by the dataflow analysis procedure. An example is analysis of intermediate states within a linearizable method without accounting for atomicity guarantees. Atomicity refers to an indivisible and irreducible series of database operations such that either all of the operations occur, or nothing occurs. A guarantee of atomicity prevents updates to the database occurring only partially, as a partial update can cause more problems than simply rejecting the whole series of updates outright. One illustrative example of an atomic transaction is a monetary transfer from a first bank account to a second bank account. This transaction consists of two operations, withdrawing the money from the first account, and depositing the money into the second account. Performing these operations in an atomic transaction ensures that the database remains in a consistent state, such that money is not lost nor created if one of the two Operations fails In view of the foregoing considerations, there exists a need to overcome at least one of the preceding deficiencies and limitations of the related art.

SUMMARY

The following summary is merely intended to be exemplary. The summary is not intended to limit the scope of the claims.

A computer-executed method for providing dataflow analysis, in one aspect, comprises selecting a plurality of sampling points from a program under examination, recording a set of respective values from a corresponding set of memory registers at each of the plurality of sampling points, the set of respective values comprising at least a first set of values stored in a first set of memory registers for a first sampling point of the plurality of sampling points, and a second set of values stored in a second set of memory registers for a second sampling point of the plurality of sampling points, and performing a correlation between the first set of values and the second set of values to retrieve dataflow information from the program under examination.

A computer-executed method for providing dataflow analysis, in a further aspect, comprises recording the set of respective values from the corresponding set of memory registers, wherein the set of respective values includes one or more values that are not readily predicted. The program under examination includes a plurality of programming languages, and the retrieving of dataflow information is applied to each language of the plurality of programming languages. The retrieving of dataflow information provides precision by recording a unique value for each value of the set of respective values.

A computer program product for providing dataflow analysis, in another aspect, comprises a non-transitory computer-readable storage medium having a computer-readable analysis program stored therein, wherein the computer-readable analysis program, when executed on a computer system comprising at least one processor, causes the computer system to select a plurality of sampling points from a program under examination, record a set of respective values from a corresponding set of memory registers at each of the plurality of sampling points, the set of respective values comprising at least a first set of values stored in a first set of memory registers for a first sampling point of the plurality of sampling points, and a second set of values stored in a second set of memory registers for a second sampling point of the plurality of sampling points, and perform a correlation between the first set of values and the second set of values to retrieve dataflow information from the program under examination.

A computer program product for providing dataflow analysis, in a further aspect, is configured for recording the set of respective values from the corresponding set of memory registers, wherein the set of respective values includes one or more values that are not readily predicted. The program under examination includes a plurality of programming languages, and the retrieving of dataflow information is applied to each language of the plurality of programming languages. The retrieving of dataflow information provides precision by recording a unique value for each value of the set of respective values.

An apparatus for providing dataflow analysis, in another aspect, may comprise a processor and a non-transitory computer-readable memory coupled to the processor, wherein the memory comprises instructions which, when executed by the processor, cause the processor to select a plurality of sampling points from a program under examination, record a set of respective values from a corresponding set of memory registers at each of the plurality of sampling points, the set of respective values comprising at least a first set of values stored in a first set of memory registers for a first sampling point of the plurality of sampling points, and a second set of values stored in a second set of memory registers for a second sampling point of the plurality of sampling points, and perform a correlation between the first set of values and the second set of values to retrieve dataflow information from the program under examination.

An apparatus for providing dataflow analysis, in a further aspect, is configured for recording the set of respective values from the corresponding set of memory registers, wherein the set of respective values includes one or more values that are not readily predicted. The program under examination includes a plurality of programming languages, and the retrieving of dataflow information is applied to each language of the plurality of programming languages. The retrieving of dataflow information provides precision by recording a unique value for each value of the set of respective values.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
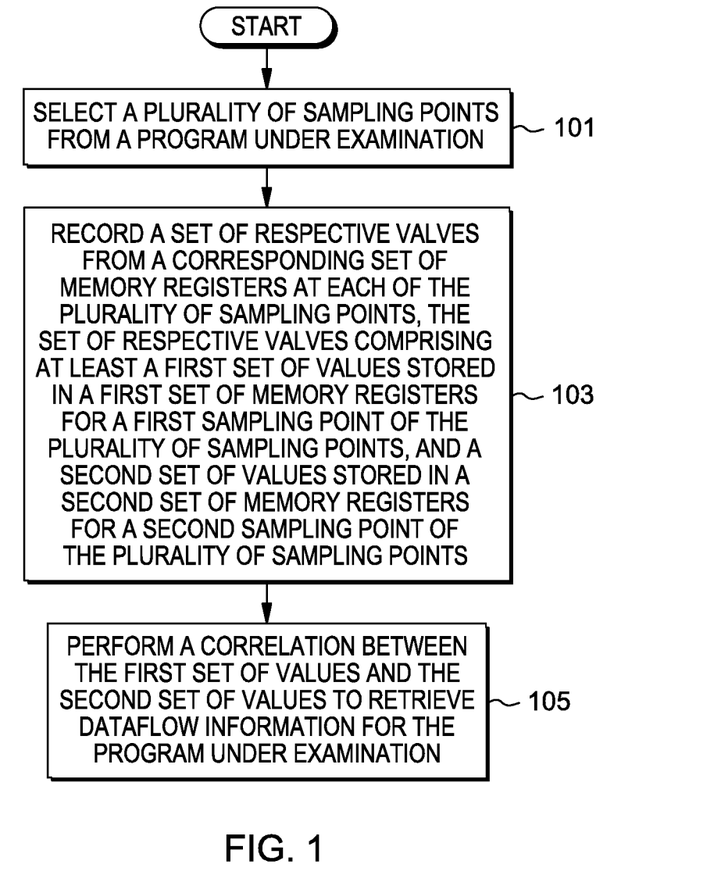
FIG. 1 is a flowchart illustrating a first exemplary method for providing a dataflow analysis procedure to be applied to a program under examination.

FIG. 1 is a flowchart illustrating a first exemplary method for providing a dataflow analysis procedure to be applied to a program under examination. The method commences at block 101 where a plurality of sampling points are selected from a program under examination. These sampling points may be selected at points in the program where small intermediate execution steps, statements, or program states are commenced or completed. Each of these execution steps, statements, or program states may be regarded as a block. Each of the blocks has an entry state and an exit state. The entry state of a first block is a function of one or more respective exit states each associated with a corresponding predecessor block that precedes the first block. Likewise, the exit state of the first block is a function of the entry state of the first block. However, in some situations, a given block may not be associated with any predecessor blocks, whereupon the entry state of such a block is generally well defined at the start of the dataflow analysis procedure.

The operational sequence progresses to block 103 where a set of respective values is recorded from a corresponding set of memory registers at each of the plurality of sampling points. The set of respective values comprises at least a first set of values stored in a first set of memory registers for a first sampling point of the plurality of sampling points, and a second set of values stored in a second set of memory registers for a second sampling point of the plurality of sampling points. Illustratively, the set of respective values includes one or more unique values that are not readily predicted or easily guessed.

Next, the operational sequence progresses to block 105 where a correlation is performed between the first set of values and the second set of values to retrieve dataflow information from the program under examination. The retrieving of dataflow information provides precision by recording a unique value for each of one or more values in the set of respective values. Illustratively, the program under examination may include a plurality of programming languages, and the retrieving of dataflow information is applied to each language of the plurality of programming languages.

Figure 2A:
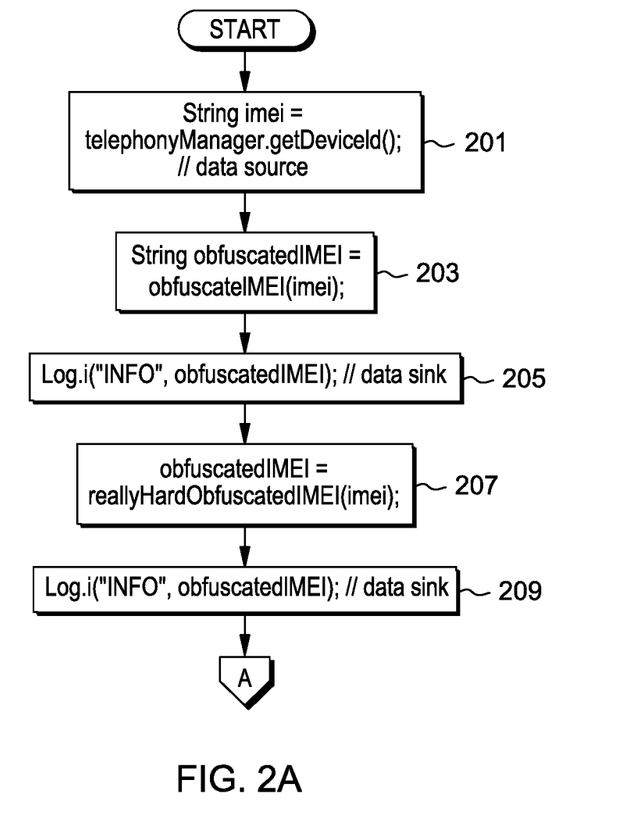
FIGS. 2A and 2B together comprise a flowchart illustrating a second exemplary method for providing dataflow analysis using a DroidBench™ testing suite.

FIGS. 2A and 2B together comprise a flowchart illustrating a second exemplary method for providing dataflow analysis using a DroidBench™ testing suite. The procedure commences at block 201 of FIG. 2A where a device identifier (ID) is received from a data source. For purposes of illustration, the device ID comprises an International Mobile Station Equipment Identity (IMEI) number. The IMEI is a number that is used to uniquely identify individual Third Generation Partnership Project (3GPP), Global System for Mobile (GSM), Universal Mobile Telecommunications System (UMTS), Fourth Generation (4G), Long-Term Evolution (LTE), and integrated Digital Enhanced Network (iDEN) mobile devices as well as some satellite phones. The IMEI is typically found printed inside the battery compartment of a mobile device, but the IMEI can also be displayed on-screen on many mobile devices by entering *#06# on the keypad, or accessed by means of a settings menu on most smartphone operating systems.

The IMEI number is used by wireless communication networks to identify valid mobile devices, and thus can be used for preventing a stolen phone from accessing that network. For example, if a mobile phone is stolen, the owner can call his or her network provider and instruct them to "blacklist" the phone using its IMEI number. This renders the phone useless on the provider's wireless communication network and most other networks, irrespective of whether or not the thief changes the phone's Subscriber Identity Module (SIM) card. However, the IMEI is only used for identifying a specific mobile device and has no permanent or semi-permanent relation to the subscriber. Instead, the subscriber is identified by an International Mobile Subscriber Identity (IMSI) number, which is stored on the subscriber's SIM card, and which (in theory) can be transferred to any mobile device. However, many network and security features can be enabled or disabled by knowing the current IMEI number being used by a subscriber.

The operational sequence progresses to block 203 where a first data masking method is applied to the IMEI that was sourced at block 201 to provide a first masked IMEI. Next, at block 205, the first masked IMEI flows to a data sink using a first Log statement. A second data masking method is applied to the first masked IMEI to generate a second masked IMEI (block 207). The second masked IMEI flows to a data sink using a second Log statement at block 209. Details of the first data masking method are shown at block 211 (FIG. 2B), and details of the second data masking method are shown at block 213.

Figure 2B:
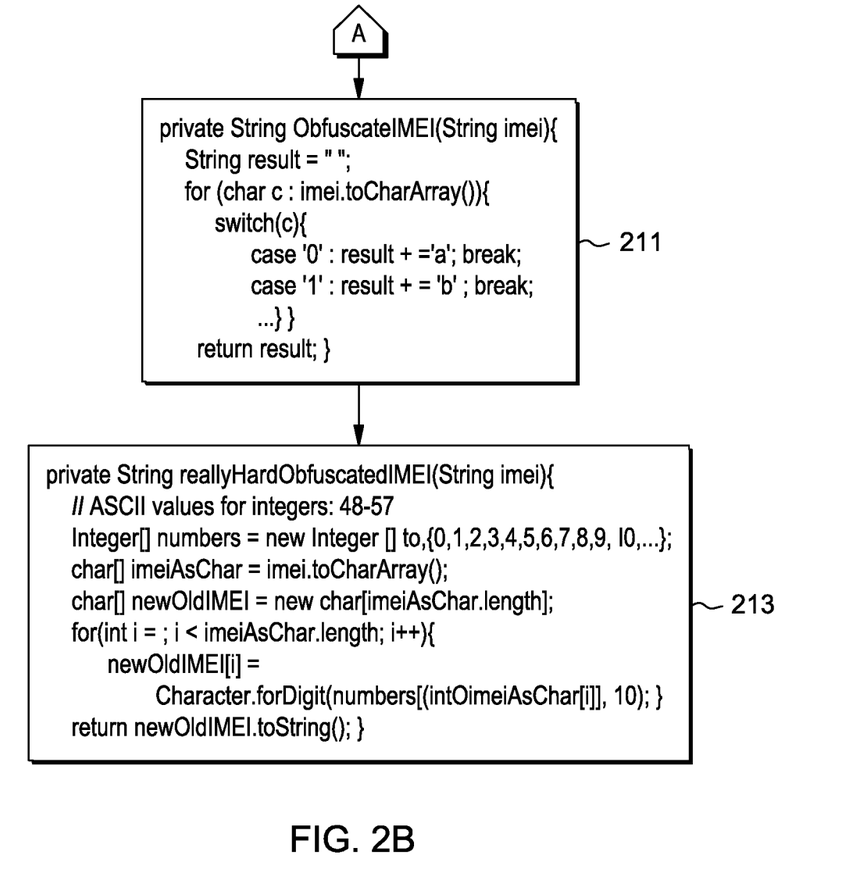

In the operational sequence of FIGS. 2A and 2B, there are at least two data flows of interest. A first data flow of interest extends between the getDeviceId( )call at block 201 (FIG. 2A) and the first Log statement of block 205. A second data flow of interest extends between the getDeviceId( )call at block 201 and the second Log statement of block 209. Both of these data flows are difficult to track at the statement level. These statements involve long traces due to looping over the input IMEI number received at block 201. Tracing refers to a specialized use of logging to record information about a program's execution. This information can be used by programmers for debugging purposes, and additionally, depending on the type and detail of information contained in a trace log, by software monitoring tools to diagnose problems with software.

When the operational sequence of FIG. 1 is applied to the data flow scenarios of FIGS. 2A and 2B, only a small fraction of a total number of events need to be recorded in the trace log. At the same time, a multitude of useful information may be recovered for both the first and second data flows of interest. Thus, a plurality of events are monitored from the program under examination, and a subset of the plurality of events are recorded in a trace log. The trace log is then used to retrieve dataflow information from the program under examination. For purposes of illustration, the subset may comprise less than ten percent of the monitored plurality of events.

It may be noted that FIGS. 2A and 2B include the following methods: the Log.i( . . . ) method of blocks 205 and 209, the first data masking method of block 211, and the second data masking method of 213. Recording only entry and exit events for all of the methods of FIGS. 2A and 2B yields the following artifacts: (1) the IMEI value; (2) an entry event into the first data masking method which captures the flow of the IMEI into this masking method; (3) an exit event from the first data masking method, which records a result $_{R1}$ of this invocation; (4) a first entry event into the method Log.i( . . . ), which records the flow of $_{R1}$ into this Log method; (5) an entry event into the second data masking method which captures the flow of the IMEI into this masking method; (6) an exit event from the second data masking method which records a result $_{R2}$ of this invocation; and (7) a second entry event into the method Log.i( . . . ), which records the flow of $_{R2}$ into this Log method.

Taken together, these seven artifacts alone suffice to reconstruct both of the foregoing dataflows of interest. Compared to a naïve approach where full instrumentation would be performed, the application of the procedure of FIG. 1 to the DroidBench method of FIGS. 2A and 2B results in a computational savings of many orders of magnitude. The naïve trace approach would comprise at least many thousands of events.

A fully-operational internal prototype implementation of the procedure described in FIG. 1 has been applied successfully to Android™ applications and will soon also extend to support the Apple™ iOS operating system. The necessary infrastructure for iOS has already been formulated. Field experiments with popular real-world Google Play™ applications confirm observations that, in the absence of the method of FIG. 1, dataflow analysis is unscalable and typically crashes. By contrast, the approach of FIG. 1 is able to detect highly complex flows (such as in the example of FIGS. 2A and 2B) within a modest time and resource budget.

Figure 3:
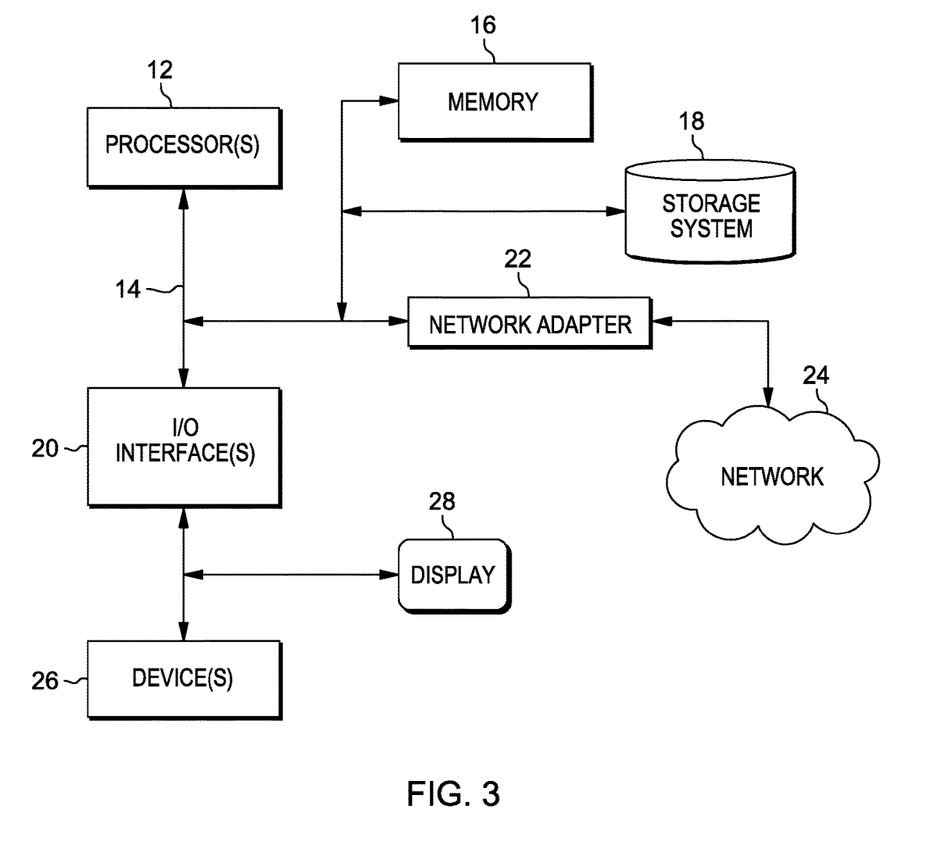
FIG. 3 is a hardware block diagram of an exemplary computer or processing system that may implement any of the methods of FIGS. 1, 2A and 2B, in one set of embodiments of the present disclosure.

FIG. 3 illustrates a schematic of an exemplary computer or processing system that may implement any of the methods of FIGS. 1, 2A and 2B in one set of embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. The computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-executed method for providing dataflow analysis, the method comprising:

selecting, using a processor, a plurality of sampling points from a program under examination, said program running first and second dataflows, each respective first and second dataflow applying a respective first method and second method for extending a single variable, and running a respective method for recording of a first output and a second output of each respective first and second method in a data sink, each first and second method comprising a processing of said single variable over a respective first and second processing loop;

accessing, by the processor, a set of memory registers, each memory register storing a data value corresponding to a sampling point;

recording, by the processor, a set of respective values from the corresponding set of memory registers at each of the plurality of sampling points, the set of respective values comprising a first set of unique values including the single variable, a value corresponding to an entry event of said single variable into a processing flow of said first method, a first result value corresponding to an exit event of said first method, and a value of a first entry event into a further method for logging said first result value, and the set of respective values further comprising a second set of unique values including a value corresponding to an entry event of said single variable into a processing flow of said second method, a second result value corresponding to an exit event of said second method, and a value of a second entry event into the further method for logging said second result value; and performing, by the processor, a correlation between the first set of values and the second set of values to retrieve dataflow information from the program under examination; and reconstructing, by the processor, said first and second data flows using said dataflow information correlating the first set of values and the second set of values, said reconstruction using a subset of a plurality of events in a trace log and avoiding logging of trace values associated with processing of said first and second processing loops, wherein an enhanced level of precision is provided by recording a unique value for each value of the set of respective values.

2. The method of claim 1 further comprising monitoring a plurality of events from the program under examination, and recording a subset of the plurality of events in the trace log.

3. The method of claim 2 further comprising using the trace log to retrieve dataflow information from the program under examination.

4. The method of claim 2 wherein the subset comprises less than ten percent of the monitored plurality of events.

5. The method of claim 1 wherein the program under examination includes a plurality of programming languages.

6. The method of claim 5 wherein the retrieving of dataflow information is applied to each language of the plurality of programming languages.

7. An apparatus for providing dataflow analysis, the apparatus comprising a processor and a non-transitory computer-readable memory coupled to the processor, wherein the memory comprises instructions which, when executed by the processor, cause the processor to:

select a plurality of sampling points from a program under examination, said program running first and second dataflows, each respective first and second dataflow applying a respective first method and second method for extending a single variable, and running a respective method for recording of a first output and a second output of each respective first and second method in a data sink, each first and second method comprising a processing of said single variable over a respective first and second processing loop;

access a set of memory registers, each memory register storing a data value corresponding to a sampling point;

record a set of respective values from the corresponding set of memory registers at each of the plurality of sampling points, the set of respective values comprising a first set of unique values including the single variable, a value corresponding to an entry event of said single variable into a processing flow of said first method, a first result value corresponding to an exit event of said first method, and a value of a first entry event into a further method for logging said first result value, and the set of respective values further comprising a second set of unique values including a value corresponding to an entry event of said single variable into a processing flow of said second method, a second result value corresponding to an exit event of said second method, and a value of a second entry event into the further method for logging said second result value; and perform a correlation between the first set of values and the second set of values to retrieve dataflow information from the program under examination; and reconstruct said first and second data flows using said dataflow information correlating the first set of values and the second set of values, said reconstruction using a subset of a plurality of events in a trace log and avoiding logging of trace values associated with processing of said first and second processing loops, wherein an enhanced level of precision is provided by recording a unique value for each value of the set of respective values.

8. The apparatus of claim 7 further configured for monitoring a plurality of events from the program under examination, and recording a subset of the plurality of events in the trace log.

9. The apparatus of claim 8 further configured for using the trace log to retrieve dataflow information from the program under examination.

10. The apparatus of claim 8 wherein the subset comprises less than ten percent of the monitored plurality of events.

11. The apparatus of claim 7 wherein the program under examination includes a plurality of programming languages.

12. The apparatus of claim 11 wherein the retrieving of dataflow information is applied to each language of the plurality of programming languages.

13. A computer program product for providing dataflow analysis, the computer program product comprising a computer-readable storage medium having a computer-readable analysis program stored therein, wherein the computer-readable analysis program, when executed on a computer system comprising at least one processor, causes the processor to:

select a plurality of sampling points from a program under examination, said program running first and second dataflows, each respective first and second dataflow applying a respective first method and second method for extending a single variable, and running a respective method for recording of a first output and a second output of each respective first and second method in a data sink, each first and second method comprising a processing of said single variable over a respective first and second processing loop;

access a set of memory registers, each memory register storing a data value corresponding to a sampling point;

record a set of respective values from the corresponding set of memory registers at each of the plurality of sampling points, the set of respective values comprising a first set of unique values including the single variable, a value corresponding to an entry event of said single variable into a processing flow of said first method, a first result value corresponding to an exit event of said first method, and a value of a first entry event into a further method for logging said first result value, and the set of respective values further comprising a second set of unique values including a value corresponding to an entry event of said single variable into a processing flow of said second method, a second result value corresponding to an exit event of said second method, and a value of a second entry event into the further method for logging said second result value; and perform a correlation between the first set of values and the second set of values to retrieve dataflow information from the program under examination; and reconstruct said first and second data flows using said dataflow information correlating the first set of values and the second set of values, said reconstruction using a subset of a plurality of events in a trace log and avoiding logging of trace values associated with processing of said first and second processing loops, wherein an enhanced level of precision is provided by recording a unique value for each value of the set of respective values.

14. The computer program product of claim 13 further configured for monitoring a plurality of events from the program under examination, and recording a subset of the plurality of events in the trace log.

15. The computer program product of claim 14 further configured for using the trace log to retrieve dataflow information from the program under examination.

16. The computer program product of claim 14 wherein the subset comprises less than ten percent of the monitored plurality of events.

17. The computer program product of claim 13 wherein the program under examination includes a plurality of programming languages.

18. The computer program product of claim 17 wherein the retrieving of dataflow information is applied to each language of the plurality of programming languages.

* * * * *